US009275007B2

(12) United States Patent
Davis et al.

(10) Patent No.: US 9,275,007 B2
(45) Date of Patent: *Mar. 1, 2016

(54) IDENTIFYING LOGICAL PLANES FORMED OF COMPUTE NODES OF A SUBCOMMUNICATOR IN A PARALLEL COMPUTER

(71) Applicant: INTERNATIONAL BUSINESS MACHINES CORPORATION, Armonk, NY (US)

(72) Inventors: Kristan D. Davis, Rochester, MN (US); Daniel A. Faraj, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 301 days.

This patent is subject to a terminal disclaimer.

(21) Appl. No.: 13/795,854

(22) Filed: Mar. 12, 2013

(65) Prior Publication Data

US 2014/0281374 A1 Sep. 18, 2014

(51) Int. Cl.
*G06F 15/80* (2006.01)

(52) U.S. Cl.
CPC ............ *G06F 15/8023* (2013.01); *G06F 15/80* (2013.01)

(58) Field of Classification Search
CPC .............................. G06F 15/80; G06F 15/8023
USPC ...................................................... 712/31, 13
See application file for complete search history.

(56) References Cited

U.S. PATENT DOCUMENTS

| 6,101,181 | A | 8/2000 | Passint et al. |
| 6,718,428 | B2 | 4/2004 | Lee et al. |
| 7,000,033 | B2 | 2/2006 | Lee |
| 7,401,161 | B2 | 7/2008 | Lee et al. |
| 2006/0117208 | A1* | 6/2006 | Davidson .......................... 714/4 |
| 2009/0055474 | A1* | 2/2009 | Archer et al. ................. 709/204 |
| 2012/0134364 | A1 | 5/2012 | Coppola et al. |
| 2013/0145003 | A1 | 6/2013 | Faraj |
| 2013/0145012 | A1 | 6/2013 | Faraj |

(Continued)

OTHER PUBLICATIONS

Haihang You, Bhanu Rekapalli, Qing Liu, and Shirley Moore. 2011. Autotuned parallel I/O for highly scalable biosequence analysis. In Proceedings of the 2011 TeraGrid Conference: Extreme Digital Discovery (TG '11). ACM, New York, NY, USA, 29, 8 pages. DOI=10.1145/2016741.2016772 http://doi.acm.org/10.1145/2016741.2016772.*

(Continued)

*Primary Examiner* — William B Partridge
*Assistant Examiner* — William Nguyen
(74) *Attorney, Agent, or Firm* — Edward J. Lenart; James R. Nock; Kennedy Lenart Spraggins LLP

(57) ABSTRACT

In a parallel computer, a plurality of logical planes formed of compute nodes of a subcommunicator may be identified by: for each compute node of the subcommunicator and for a number of dimensions beginning with a first dimension: establishing, by a plane building node, in a positive direction of the first dimension, all logical planes that include the plane building node and compute nodes of the subcommunicator in a positive direction of a second dimension, where the second dimension is orthogonal to the first dimension; and establishing, by the plane building node, in a negative direction of the first dimension, all logical planes that include the plane building node and compute nodes of the subcommunicator in the positive direction of the second dimension.

12 Claims, 10 Drawing Sheets

(56) References Cited

U.S. PATENT DOCUMENTS

2014/0281377 A1 9/2014 Davis et al.
2015/0106419 A1 4/2015 Davis et al.
2015/0106482 A1 4/2015 Davis et al.

OTHER PUBLICATIONS

Yu, et al.; "Topology Mapping for Blue Gene/L Supercomputer", *SC '06 Proceedings of the 2006 ACM/IEEE Conference on Supercomputing,* Article No. 16, Nov. 2006, pp. 1-13, ACM New York.

Rinke; "Analysis and Adaption of Graph Mapping Algorithms for Regular Graph Topologies", *Chemnitz University of Technology Diploma Thesis,* Apr. 2009, pp. 1-96.

Träff; "Implementing the MPI Process Topology Mechanism", *Proceedings of the 2002 ACM/IEEE conference on Supercomputing,* Nov. 2002, pp. 1-14, IEEE Computer Society Press, Los Alamitos, CA.

Hartmann, et al.; "Adaptive Selection of Communication Methods to Optimize Collective MPI Operations", *Parallel Computing: Current & Future Issues of High-End Computing,* Proceedings of the International Conference ParCo 2005, vol. 33, Oct. 2006, pp. 457-464, John von Neumann Institute for Computing(NIC), Julich.

Virrankoski et al., "TASC: Topology Adaptive Spatial Clustering for Sensor Networks", IEEE International Conference on Mobile Adhoc and Sensor Systems, Nov. 2005, 10 pages, IEEE.org (online publication), DOI: 10.1109/MAHSS.2005.1542850.

Chen et al., "Meshlization of Irregular Grid Resource Topologies by Heuristic Square-Packing Methods", International Journal of Grid and Distributed Computing, Dec. 2009, pp. 9-16, vol. 2, No. 4, Science & Engineering Research Support Society, Republic of Korea.

Wang et al., On An Efficient Noc Multicasting Scheme in Support of Multiple Applications Running on Irregular Sub-Networks, Microprocessors and Microsystems, vol. 35, Issue 2, Mar. 2011, pp. 119-129, Elsevier, USA.

* cited by examiner

IDENTIFYING LOGICAL PLANES FORMED OF COMPUTE NODES OF A SUBCOMMUNICATOR IN A PARALLEL COMPUTER

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for identifying a plurality of logical planes formed of compute nodes of a subcommunicator in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In such a manner, a torus network lends itself to point to point operations. In a tree network, the nodes typically are connected into a binary tree: each node has a parent, and two children (although some nodes may only have zero children or one child, depending on the hardware configuration). Although a tree network typically is inefficient in point to point communication, a tree network does provide high bandwidth and low latency for certain collective operations, message passing operations where all compute nodes participate simultaneously, such as, for example, an allgather operation. In computers that use a torus and a tree network, the two networks typically are implemented independently of one another, with separate routing circuits, separate physical links, and separate message buffers.

SUMMARY OF THE INVENTION

Methods, apparatus, and products for identifying a plurality of logical planes formed of compute nodes of a subcommunicator in a parallel computer are disclosed. Identifying such logical planes may be carried out, for each compute node of the subcommunicator and for a plurality of dimensions beginning with a first dimension by establishing, by a plane building node, in a positive direction of the first dimension, all logical planes that include the plane building node and compute nodes of the subcommunicator in a positive direction of a second dimension, where the second dimension is orthogonal to the first dimension; and establishing, by the plane building node, in a negative direction of the first dimension, all logical planes that include the plane building node and compute nodes of the subcommunicator in the positive direction of the second dimension.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
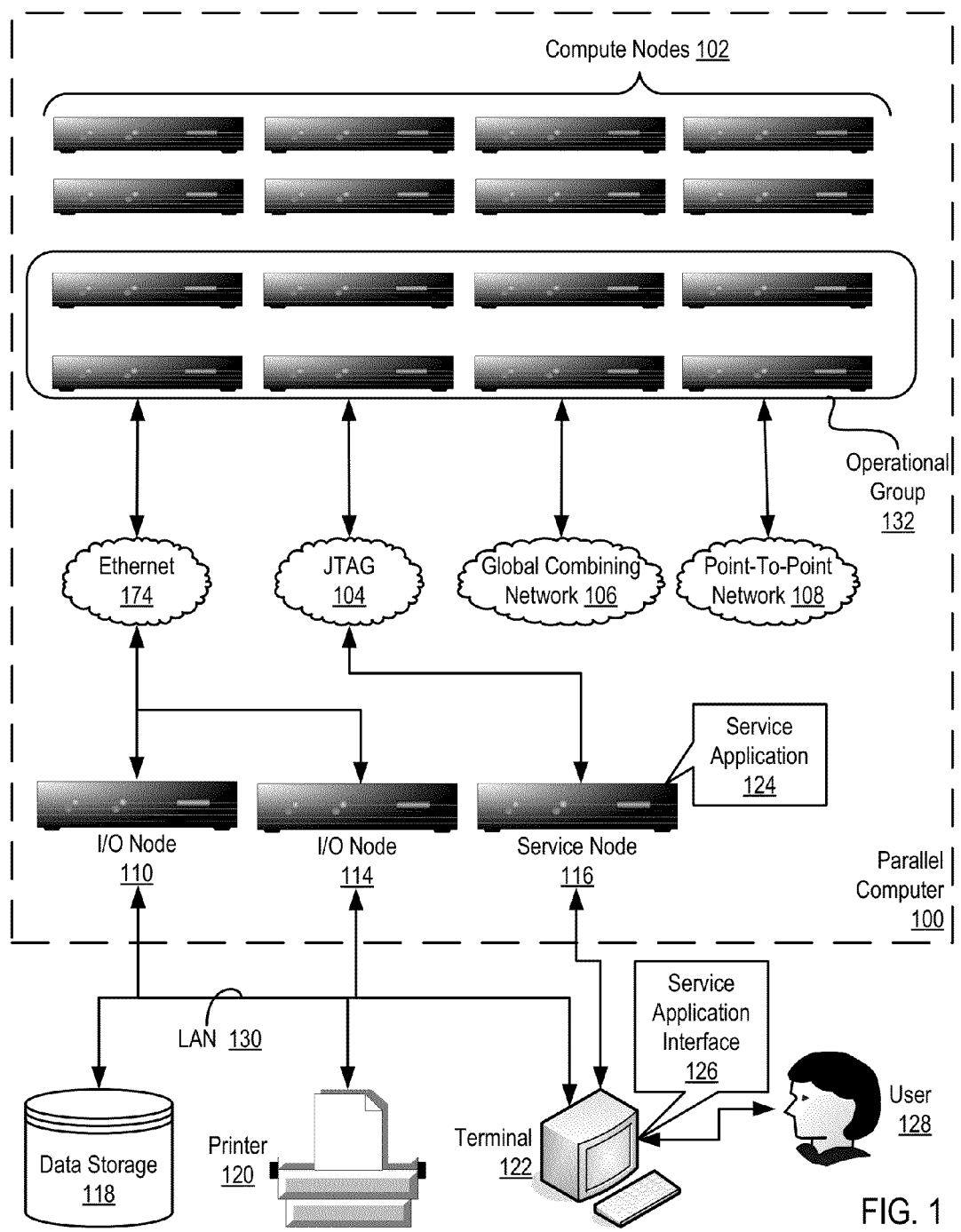
FIG. 1 illustrates an exemplary system for identifying a plurality of logical planes formed of compute nodes of a subcommunicator in a parallel computer according to embodiments of the present invention.

Exemplary methods, apparatus, and products for identifying a plurality of logical planes formed of compute nodes of a subcommunicator in a parallel computer in accordance with the present invention are described with reference to the accompanying drawings, beginning with FIG. 1. FIG. 1 illustrates an exemplary system for identifying a plurality of logical planes formed of compute nodes of a subcommunicator in a parallel computer according to embodiments of the present invention. The system of FIG. 1 includes a parallel computer (100), non-volatile memory for the computer in the form of a data storage device (118), an output device for the computer in the form of a printer (120), and an input/output device for the computer in the form of a computer terminal (122).

The parallel computer (100) in the example of FIG. 1 includes a plurality of compute nodes (102). The compute nodes (102) are coupled for data communications by several independent data communications networks including a high speed Ethernet network (174), a Joint Test Action Group ('JTAG') network (104), a global combining network (106) which is optimized for collective operations using a binary tree network topology, and a point-to-point network (108), which is optimized for point-to-point operations using a torus network topology. The global combining network (106) is a data communications network that includes data communications links connected to the compute nodes (102) so as to organize the compute nodes (102) as a binary tree. Each data communications network is implemented with data communications links among the compute nodes (102). The data communications links provide data communications for parallel operations among the compute nodes (102) of the parallel computer (100).

The compute nodes (102) of the parallel computer (100) are organized into at least one operational group (132) of compute nodes for collective parallel operations on the parallel computer (100). Each operational group (132) of compute nodes is the set of compute nodes upon which a collective parallel operation executes. Each compute node in the operational group (132) is assigned a unique rank that identifies the particular compute node in the operational group (132). Collective operations are implemented with data communications among the compute nodes of an operational group. Collective operations are those functions that involve all the compute nodes of an operational group (132). A collective operation is an operation, a message-passing computer program instruction that is executed simultaneously, that is, at approximately the same time, by all the compute nodes in an operational group (132) of compute nodes. Such an operational group (132) may include all the compute nodes (102) in a parallel computer (100) or a subset all the compute nodes (102). Collective operations are often built around point-to-point operations. A collective operation requires that all processes on all compute nodes within an operational group (132) call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group (132). An operational group (132) may be implemented as, for example, an MPI 'communicator' or a subset of the communicator, called a subcommunicator.

'MPI' refers to 'Message Passing Interface,' a prior art parallel communications library, a module of computer program instructions for data communications on parallel computers. Examples of prior-art parallel communications libraries that may be improved for use in systems configured according to embodiments of the present invention include MPI and the 'Parallel Virtual Machine' ('PVM') library. PVM was developed by the University of Tennessee, The Oak Ridge National Laboratory and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group (132). For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. In a scatter operation, the logical root divides data on the root into segments and distributes a different segment to each compute node in the operational group (132). In scatter operation, all processes typically specify the same receive count. The send arguments are only significant to the root process, whose buffer actually contains sendcount*N elements of a given datatype, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduction operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process' receive buffer. Application specific reduction operations can be defined at runtime. Parallel communications libraries may support predefined operations. MPI, for example, provides the following pre-defined reduction operations:

| MPI_MAX | maximum |
| --- | --- |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes (102) in the parallel computer (100) may be partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer (102). For example, in some configurations, each processing set may be composed of eight compute nodes and one I/O node. In some other configurations, each processing set may be composed of sixty-four compute nodes and one I/O node. Such example are for explanation only, however, and not for limitation. Each I/O node provides I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

Figure 7:
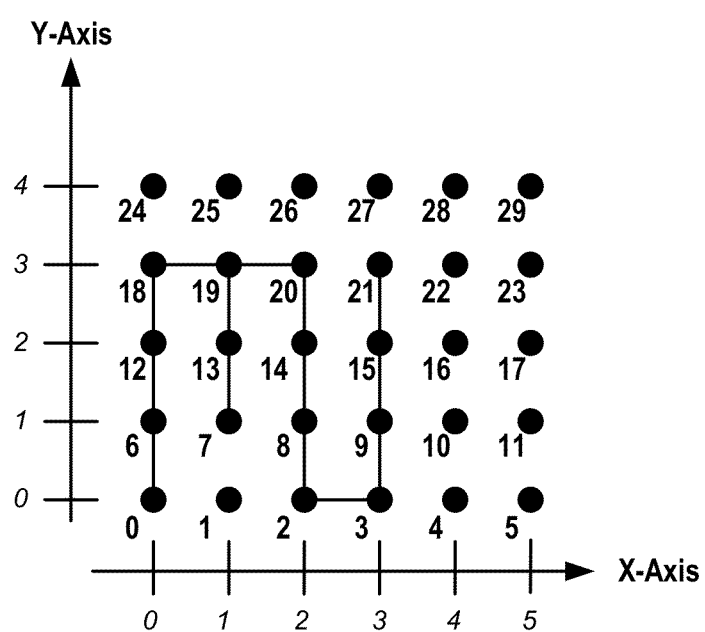
FIG. 7 sets forth a line drawing illustrating an example communicator and subcommunicator from which a plurality of logical planes formed of compute nodes of the subcommunicator may be identified according to embodiments of the present invention.

The parallel computer (100) of FIG. 1 operates generally for identifying a plurality of logical planes formed of compute nodes of a subcommunicator in a parallel computer in accordance with embodiments of the present invention. A communicator is an example of an operational group, a set of compute nodes configured for data communications and collective operations. A subcommunicator is a subset of the communicator. A communicator is generally established in a regular data communications topology—a mesh, grid, or torus for example. A regular topology is one in which no gaps (disconnects in communication paths) exist between nodes. Generally, a regular topology is axial, meaning that the topology is defined among one or more axes, such as an X axis, Y axis, and Z axis. An example of a communicator having a regular topology is depicted in FIG. 7. In that example, the communicator includes 30 nodes in a regular, axial grid pattern.

An irregular topology is a topology in which gaps exist between nodes in the same axis. Consider as an example, the communicator in FIG. 7. The nodes in the communicator of FIG. 7 that are coupled by links represent nodes of a subcommunicator. As can be seen in FIG. 7, the subcommunicator is an irregular topology. Node 0 for example, is separated from node 2, both of which are in the same axis and part of the same subcommunicator.

Some data communications optimizations often rely on an underlying regular topology—axial or planar topology—to be performed. A deposit bit optimization, for example, generally enables fast communication along one or more axes of a set of compute nodes. The deposit bit optimization enables a communications adapter of a first node to receive a message and forward the message to the next node in the same axis immediately as well as the next node in a next (or orthogonal) axis, even before copying the message to local memory for a process executing on the first compute node. The communication adapter of each compute node receiving that message, can carry out exactly the same steps such that a single message may be broadcast down a one or more axes very quickly. When the compute nodes on one or more axes, however, include one or more data communication gaps, the bit deposit optimization fails.

To that end, parallel computer (100) of FIG. 1 operates generally for identifying a plurality of logical planes formed of compute nodes of a subcommunicator in a parallel computer in accordance with embodiments of the present invention. The term 'logical' here refers to a topology that is not a physical topology. Identifying a plurality of logical planes formed of compute nodes of a subcommunicator may be carried out by each node of the subcommunicator, in parallel. That is, each compute node of the subcommunicator may separately, and in parallel, identify logical planes for which that compute node is a part. Each compute node (referred to as a 'plane building node' here when identifying logical planes for which the compute node is included) may, for a plurality of dimensions beginning with a first dimension: establish in a positive direction of the first dimension, all logical planes that include the plane building node and compute nodes of the subcommunicator in a positive direction of a second dimension, where the second dimension is orthogonal to the first dimension. Then the plane building node may establish in a negative direction of the first dimension, all logical planes that include the plane building node and compute nodes of the subcommunicator in the positive direction of the second dimension. Each step described here may be carried out in an iterative fashion: for example, identifying a first plane in the positive direction of the first dimension, identifying a second plane in the positive direction of the first dimension, and so on, until all planes including the compute node in the positive direction of the first dimension have been identified. Such an iterative process is described below in detail with respect to FIGS. 7-11B.

As mentioned above, identifying a plurality of logical planes formed of compute nodes of a subcommunicator in a parallel computer according to embodiments of the present invention is generally implemented on a parallel computer that includes a plurality of compute nodes organized for collective operations through at least one data communications network. In fact, such parallel computers may include thousands of such compute nodes. Each compute node is in turn itself a kind of computer which may be composed of one or more computer processing cores, its own computer memory, and its own input/output adapters. For further explanation, therefore, FIG. 2 sets forth a block diagram of an example compute node (102) useful in a parallel computer capable of identifying a plurality of logical planes formed of compute nodes of a subcommunicator in a parallel computer according to embodiments of the present invention. The compute node (102) of FIG. 2 includes a plurality of processing cores (165) as well as RAM (156). The processing cores (165) of FIG. 2 may be configured on one or more integrated circuit dies. Processing cores (165) are connected to RAM (156) through a high-speed memory bus (155) and through a bus adapter (194) and an extension bus (168) to other components of the compute node. Stored in RAM (156) is an application program (226), a module of computer program instructions that carries out parallel, user-level data processing using parallel algorithms.

Also stored RAM (156) is a parallel communications library (161), a library of computer program instructions that carry out parallel communications among compute nodes, including point-to-point operations as well as collective operations. A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Figure 2:
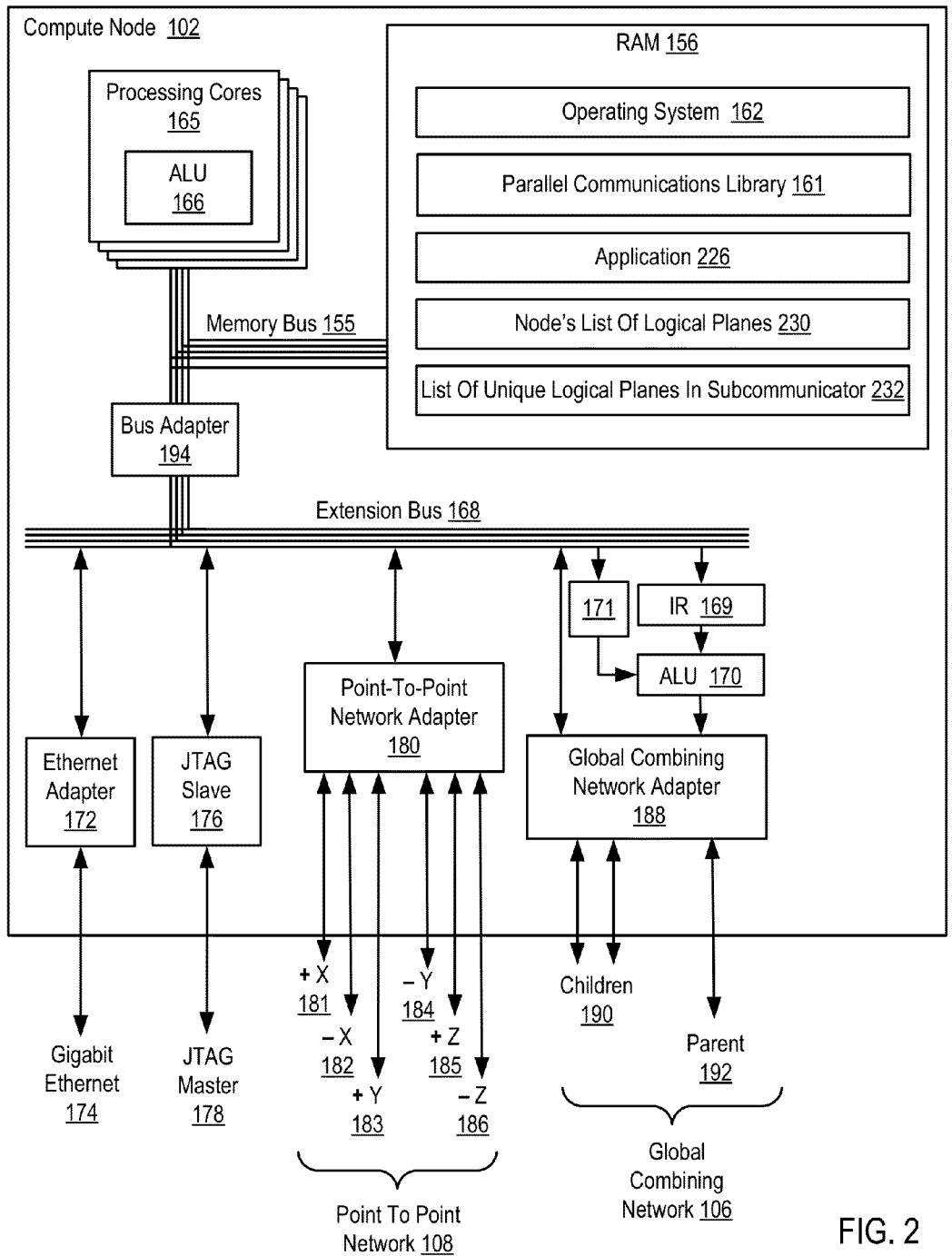
FIG. 2 sets forth a block diagram of an example compute node of a parallel computer configured for identifying a plurality of logical planes formed of compute nodes of a subcommunicator in a parallel computer according to embodiments of the present invention.

The compute node (102) of FIG. 2 operates generally for identifying a plurality of logical planes formed of compute nodes of a subcommunicator in a parallel computer in accordance with embodiments of the present invention. The communicator, of which the subcommunicator is a part, may be a regular topology such as a grid or a mesh. The parallel communications library (161) may be configured to identify such logical planes, by carrying out the following steps iteratively for each of a plurality of dimensions beginning with a first dimension: establishing, by a plane building node (the compute node 102 in the example of FIG. 2), in a positive direction of the first dimension, all logical planes that include the plane building node and compute nodes of the subcommunicator in a positive direction of a second dimension. In this example, the second dimension is orthogonal to the first dimension—the X dimension, for example may be the first dimension, and the Y dimension may be the second dimension. Then, the plane building node (102) may establish, in a negative direction of the first dimension, all logical planes that include the plane building node and compute nodes of the subcommunicator in the positive direction of the second dimension. The logical planes established by the plane building node (1020 may be stored in a list of logical planes (230).

Because all compute nodes of the subcommunicator separately and in parallel identify the logical planes of the subcommunicator of which the compute node is included, some compute nodes may identify, separately, identical logical planes. To filter the duplicate planes identified by the compute nodes of the subcommunicator, at least one compute node in the subcommunicator may construct a set (232) of unique logical planes of the subcommunicator in dependence upon the logical planes established by each node. Constructing such a set (232) of unique logical planes of the subcommunicator may be carried out in various ways. In one way, the compute node may establish an list, add an entry in the list for a logical plane identified by a compute node, and before adding another entry for another logical plane determining that the logical plane to be added is not already included in the list. In this way, only unique entries are added to the last. Each entry, for example, may be a vector of four coordinates:

coordinates of a compute node at the lower left of the plane, coordinates of the compute node at the lower right of the plane, coordinates of the compute node of at the upper left of the plane, and coordinates of the compute node at the upper right of the plane. Once the list is complete (all logical planes established by the compute nodes of the subcommunicator have been processed and only unique planes have been included in the list), the list may be broadcast to all compute nodes of the subcommunicator. Then, any subcommunicator node may refer to the list of unique planes to transmit messages among the subcommunicator using optimizations that rely on planar topologies.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (102) of FIG. 2, another factor that decreases the demands on the operating system. The operating system (162) may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Windows XP™, AIX™, IBM's i5/OS™, and others as will occur to those of skill in the art.

The example compute node (102) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in apparatus useful for constructing a logical, regular axis topology from an irregular topology of a subcommunicator's compute nodes in a parallel computer include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (102) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 include a JTAG Slave circuit (176) that couples example compute node (102) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient alternative access point into the system. The example compute node of FIG. 2 may be all three of these: It typically includes one or more integrated circuits installed on a printed circuit board and may be implemented as an embedded system having its own processing core, its own memory, and its own I/O capability. JTAG boundary scans through JTAG Slave (176) may efficiently configure processing core registers and memory in compute node (102) for use in dynamically reassigning a connected node to a block of compute nodes useful in systems for constructing a logical, regular axis topology from an irregular topology of a subcommunicator's compute nodes in a parallel computer to embodiments of the present invention.

The data communications adapters in the example of FIG. 2 include a Point-To-Point Network Adapter (180) that couples example compute node (102) for data communications to a network (108) that is optimal for point-to-point message passing operations such as, for example, a network configured as a three-dimensional torus or mesh. The Point-To-Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 include a Global Combining Network Adapter (188) that couples example compute node (102) for data communications to a global combining network (106) that is optimal for collective message passing operations such as, for example, a network configured as a binary tree. The Global Combining Network Adapter (188) provides data communications through three bidirectional links for each global combining network (106) that the Global Combining Network Adapter (188) supports. In the example of FIG. 2, the Global Combining Network Adapter (188) provides data communications through three bidirectional links for global combining network (106): two to children nodes (190) and one to a parent node (192).

The example compute node (102) includes multiple arithmetic logic units ('ALUs'). Each processing core (165) includes an ALU (166), and a separate ALU (170) is dedicated to the exclusive use of the Global Combining Network Adapter (188) for use in performing the arithmetic and logical functions of reduction operations, including an allreduce operation. Computer program instructions of a reduction routine in a parallel communications library (161) may latch an instruction for an arithmetic or logical function into an instruction register (169). When the arithmetic or logical function of a reduction operation is a 'sum' or a 'logical OR,' for example, the collective operations adapter (188) may execute the arithmetic or logical operation by use of the ALU (166) in the processing core (165) or, typically much faster, by use of the dedicated ALU (170) using data provided by the nodes (190, 192) on the global combining network (106) and data provided by processing cores (165) on the compute node (102).

Often when performing arithmetic operations in the global combining network adapter (188), however, the global combining network adapter (188) only serves to combine data received from the children nodes (190) and pass the result up the network (106) to the parent node (192). Similarly, the global combining network adapter (188) may only serve to transmit data received from the parent node (192) and pass the data down the network (106) to the children nodes (190). That is, none of the processing cores (165) on the compute node (102) contribute data that alters the output of ALU (170), which is then passed up or down the global combining network (106). Because the ALU (170) typically does not output any data onto the network (106) until the ALU (170) receives input from one of the processing cores (165), a processing core (165) may inject the identity element into the dedicated ALU (170) for the particular arithmetic operation being perform in the ALU (170) in order to prevent alteration of the output of the ALU (170). Injecting the identity element into the ALU, however, often consumes numerous processing cycles. To further enhance performance in such cases, the example compute node (102) includes dedicated hardware (171) for injecting identity elements into the ALU (170) to reduce the amount of processing core resources required to prevent alteration of the ALU output. The dedicated hardware (171) injects an identity element that corresponds to the particular arithmetic operation performed by the ALU. For example, when the global combining network adapter (188) performs a bitwise OR on the data received from the children nodes (190), dedicated hardware (171) may inject zeros into the ALU (170) to improve performance throughout the global combining network (106).

Figure 3A:
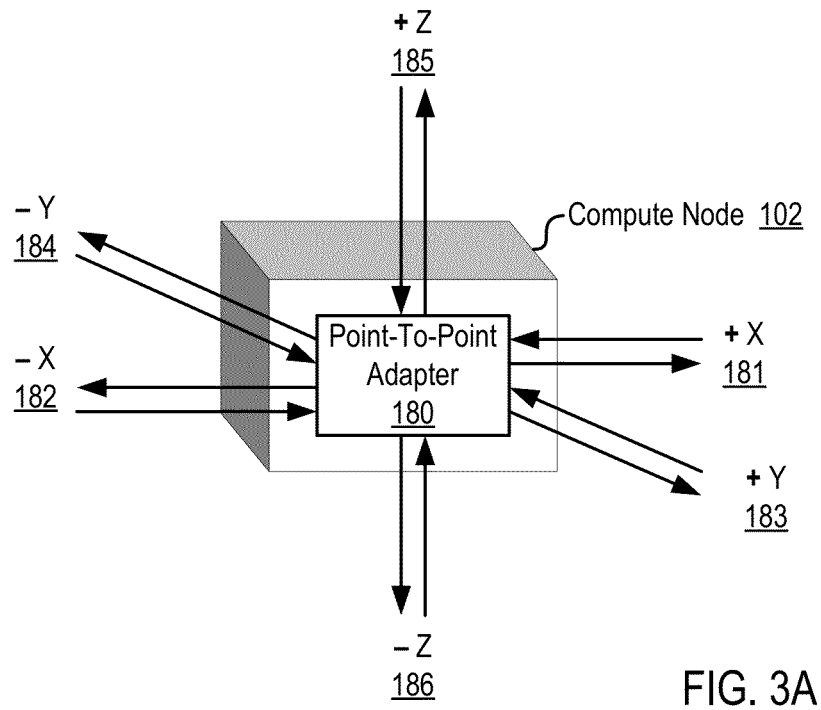
FIG. 3A sets forth a block diagram of an example Point-To-Point Adapter useful in systems for identifying a plurality of logical planes formed of compute nodes of a subcommunicator in a parallel computer according to embodiments of the present invention.

For further explanation, FIG. 3A sets forth a block diagram of an example Point-To-Point Adapter (180) useful in systems for identifying a plurality of logical planes formed of compute nodes of a subcommunicator in a parallel computer according to embodiments of the present invention. The Point-To-Point Adapter (180) is designed for use in a data communications network optimized for point-to-point operations, a network that organizes compute nodes in a three-dimensional torus or mesh. The Point-To-Point Adapter (180) in the example of FIG. 3A provides data communication along an x-axis through four unidirectional data communications links, to and from the next node in the −x direction (182) and to and from the next node in the +x direction (181). The Point-To-Point Adapter (180) of FIG. 3A also provides data communication along a y-axis through four unidirectional data communications links, to and from the next node in the −y direction (184) and to and from the next node in the +y direction (183). The Point-To-Point Adapter (180) of FIG. 3A also provides data communication along a z-axis through four unidirectional data communications links, to and from the next node in the −z direction (186) and to and from the next node in the +z direction (185).

Figure 3B:
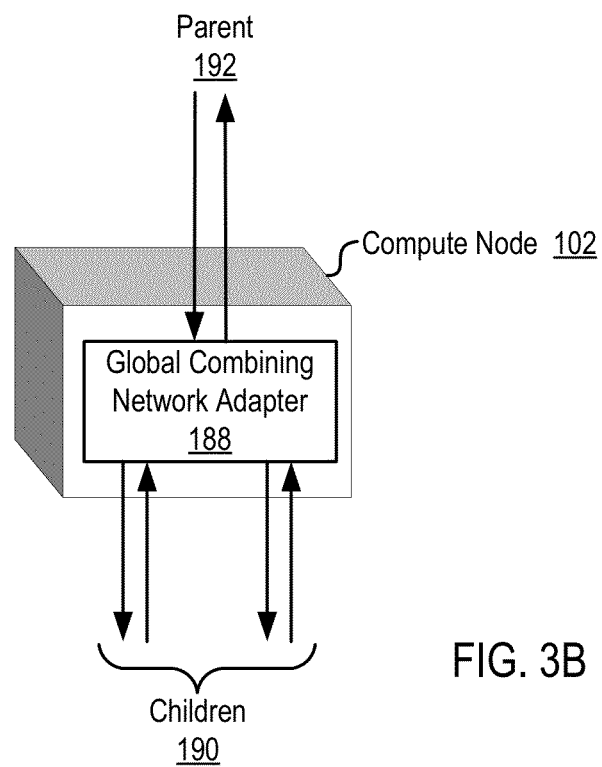
FIG. 3B sets forth a block diagram of an example Global Combining Network Adapter useful in systems for identifying a plurality of logical planes formed of compute nodes of a subcommunicator in a parallel computer according to embodiments of the present invention.

For further explanation, FIG. 3B sets forth a block diagram of an example Global Combining Network Adapter (188) useful in systems for identifying a plurality of logical planes formed of compute nodes of a subcommunicator in a parallel computer according to embodiments of the present invention. The Global Combining Network Adapter (188) is designed for use in a network optimized for collective operations, a network that organizes compute nodes of a parallel computer in a binary tree. The Global Combining Network Adapter (188) in the example of FIG. 3B provides data communication to and from children nodes of a global combining network through four unidirectional data communications links (190), and also provides data communication to and from a parent node of the global combining network through two unidirectional data communications links (192).

Figure 4:
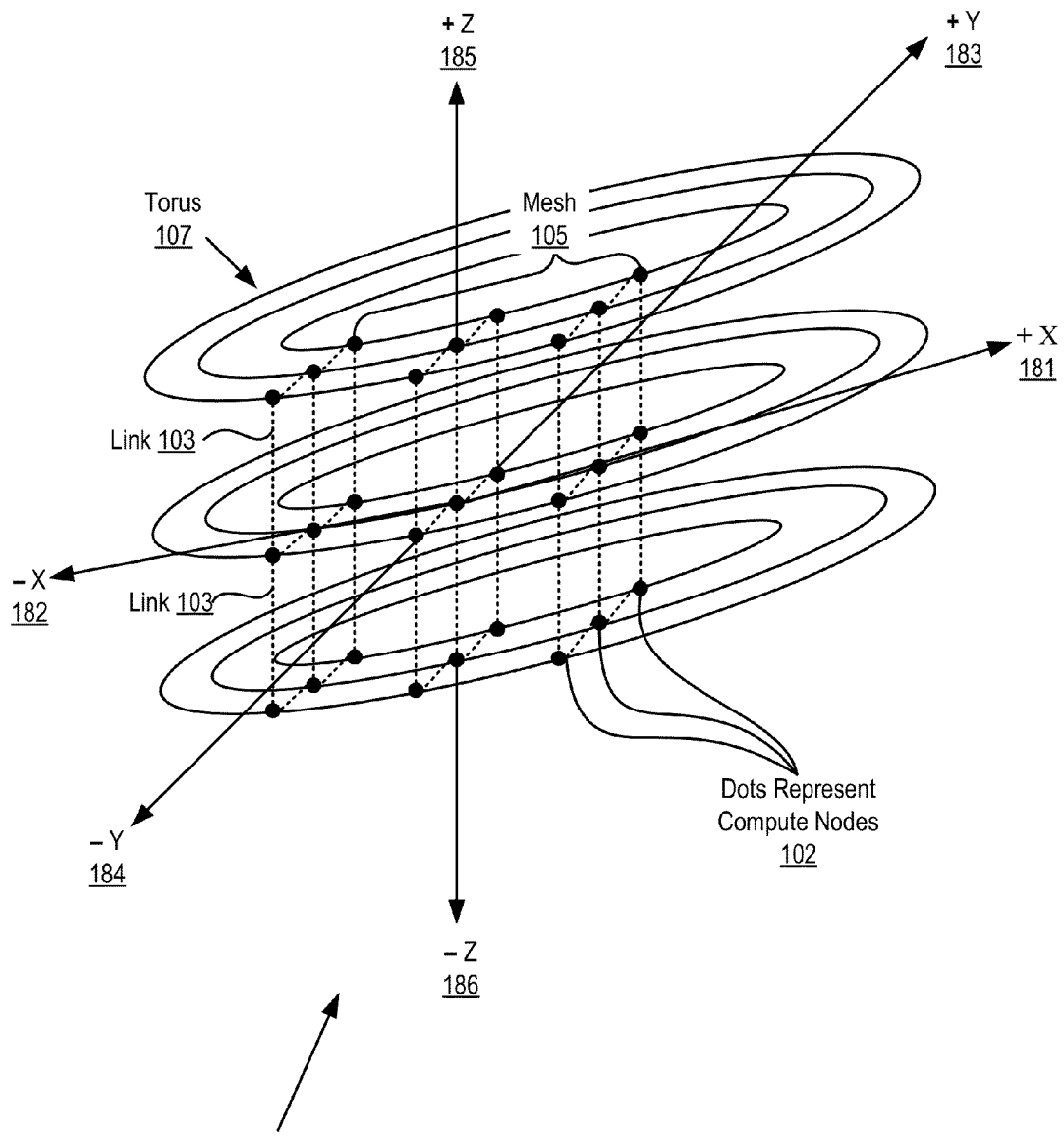
FIG. 4 sets forth a line drawing illustrating an example data communications network optimized for point-to-point operations useful in systems capable of identifying a plurality of logical planes formed of compute nodes of a subcommunicator in a parallel computer according to embodiments of the present invention.

For further explanation, FIG. 4 sets forth a line drawing illustrating an example data communications network (108) optimized for point-to-point operations useful in systems capable of identifying a plurality of logical planes formed of compute nodes of a subcommunicator in a parallel computer according to embodiments of the present invention. In the example of FIG. 4, dots represent compute nodes (102) of a parallel computer, and the dotted lines between the dots represent data communications links (103) between compute nodes. The data communications links are implemented with point-to-point data communications adapters similar to the one illustrated for example in FIG. 3A, with data communications links on three axis, x, y, and z, and to and fro in six directions +x (181), −x (182), +y (183), −y (184), +z (185), and −z (186). The links and compute nodes are organized by this data communications network optimized for point-to-point operations into a three dimensional mesh (105). The mesh (105) has wrap-around links on each axis that connect the outermost compute nodes in the mesh (105) on opposite sides of the mesh (105). These wrap-around links form a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point-to-point operations for use in identifying a plurality of logical planes formed of compute nodes of a subcommunicator in a parallel computer according to embodiments of the present invention in accordance with embodiments of the present invention may contain only a few compute nodes or may contain thousands of compute nodes. For ease of explanation, the data communications network of FIG. 4 is illustrated with only three dimensions, but readers will recognize that a data communications network optimized for point-to-point operations for use in constructing a logical, regular axis topology from an irregular topology of a subcommunicator's compute nodes in a parallel computer in accordance with embodiments of the present invention may in facet be implemented in two dimensions, four dimensions, five dimensions, and so on. Several supercomputers now use five dimensional mesh or torus networks, including, for example, IBM's Blue Gene Q™.

Figure 5:
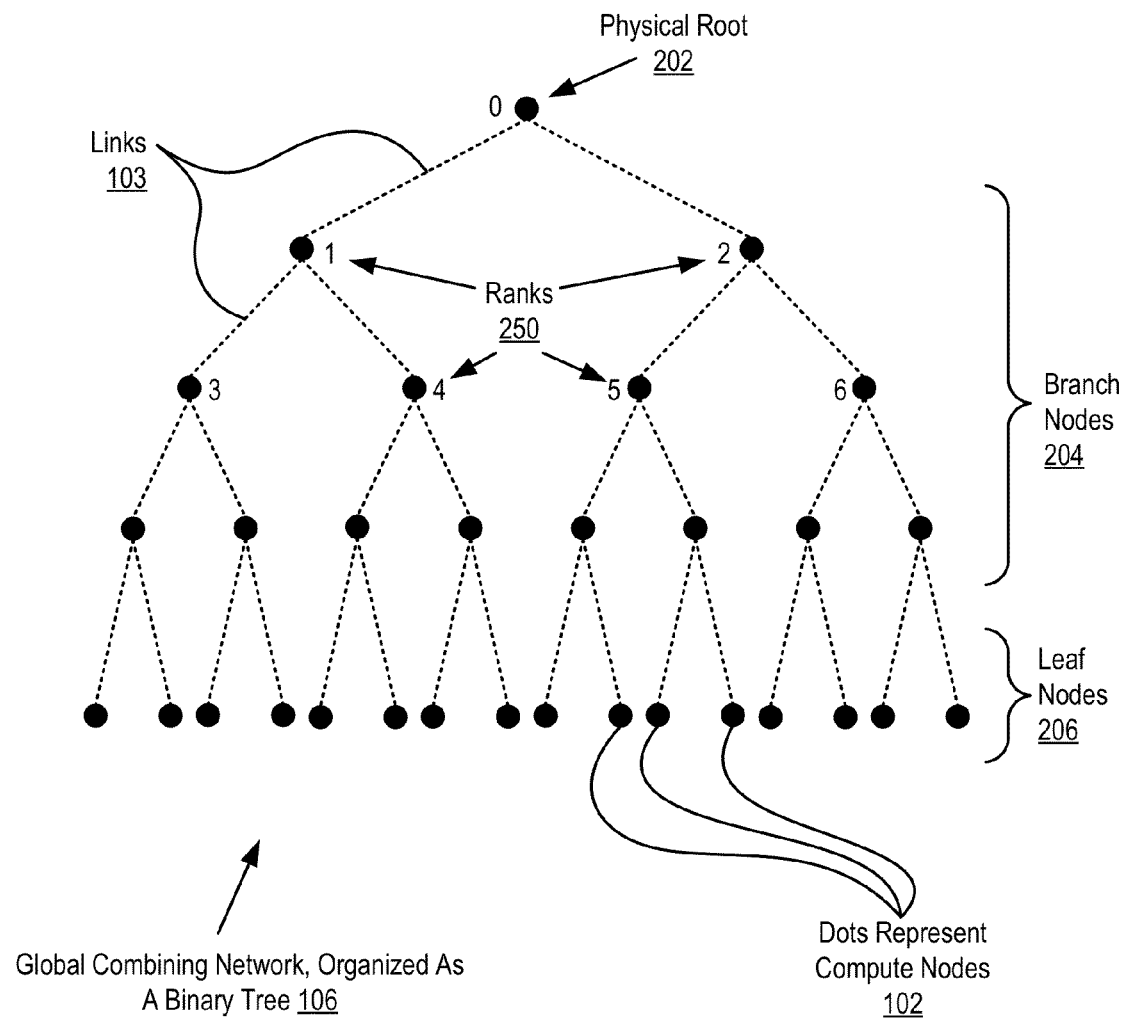
FIG. 5 sets forth a line drawing illustrating an example global combining network useful in systems capable of identifying a plurality of logical planes formed of compute nodes of a subcommunicator in a parallel computer according to embodiments of the present invention.

For further explanation, FIG. 5 sets forth a line drawing illustrating an example global combining network (106) useful in systems capable of constructing a logical, regular axis topology from an irregular topology of a subcommunicator's compute nodes in a parallel computer according to embodiments of the present invention. The example data communications network of FIG. 5 includes data communications links (103) connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in the global combining network (106) may be characterized as a physical root node (202), branch nodes (204), and leaf nodes (206). The physical root (202) has two children but no parent and is so called because the physical root node (202) is the node physically configured at the top of the binary tree. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a global combining network (106) optimized for collective operations for use in constructing a logical, regular axis topology from an irregular topology of a subcommunicator's compute nodes in a parallel computer in accordance with embodiments of the present invention may contain only a few compute nodes or may contain thousands of compute nodes.

In the example of FIG. 5, each node in the tree is assigned a unit identifier referred to as a 'rank' (250). The rank actually identifies a task or process that is executing a parallel operation according to embodiments of the present invention. Using the rank to identify a node assumes that only one such task is executing on each node. To the extent that more than one participating task executes on a single node, the rank identifies the task as such rather than the node. A rank uniquely identifies a task's location in the tree network for use in both point-to-point and collective operations in the tree network. The ranks in this example are assigned as integers beginning with 0 assigned to the root tasks or root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
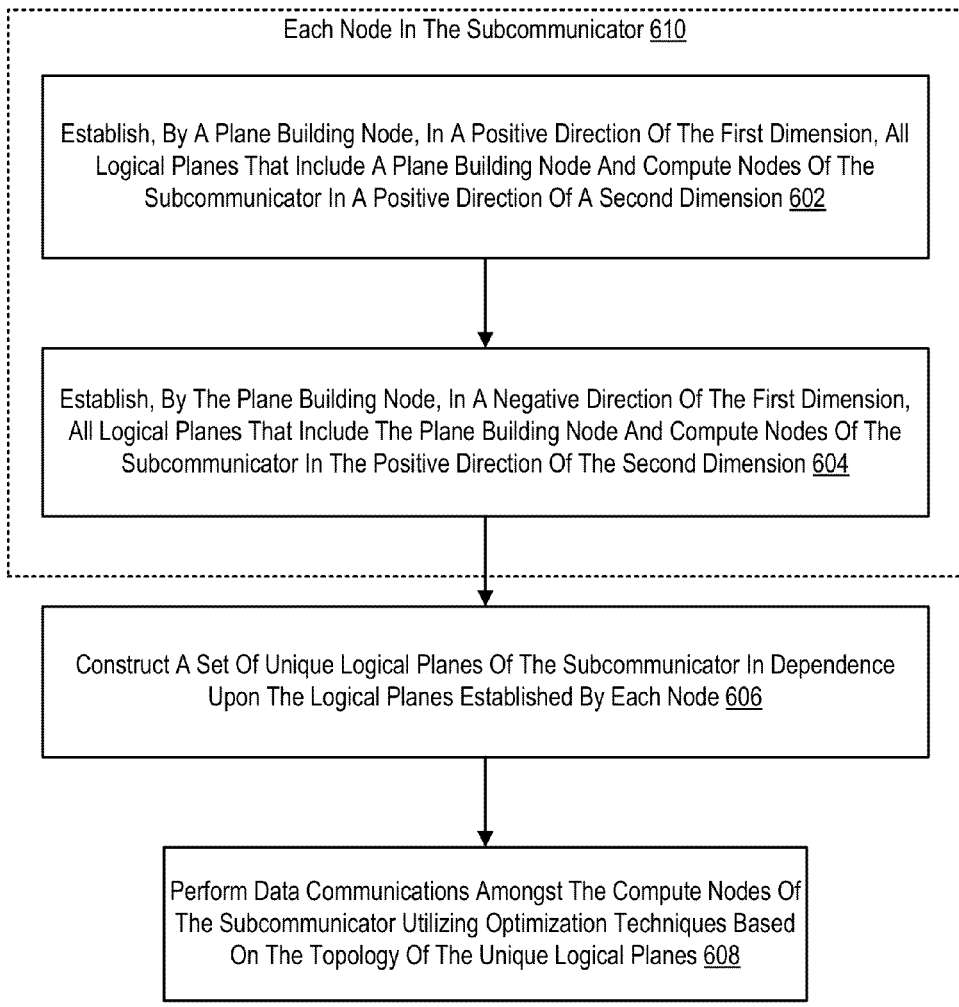
FIG. 6 sets forth a flow chart illustrating an example method for identifying a plurality of logical planes formed of compute nodes of a subcommunicator in a parallel computer according to embodiments of the present invention.

For further explanation, FIG. 6 sets forth a flow chart illustrating an example method for identifying a plurality of logical planes formed of compute nodes of a subcommunicator in a parallel computer according to embodiments of the present invention. The method of FIG. 6 is carried out in a parallel computer in which the subcommunicator includes a subset of a communicator's compute nodes and the communicator's compute nodes are organized into a regular topology that includes a plurality of axial dimensions. In some embodiments the regular topology is a torus network topology that includes N-dimensions, where N is an integer greater than one—a five dimensional torus network topology for example.

The method of FIG. 6 includes several steps that are carried out separately and in parallel by each compute node (610) of the subcommunicator. Those steps are also carried out iteratively, for a plurality of dimensions beginning with a first dimension. One of those steps includes establishing (602), by a plane building node, in a positive direction of the first dimension, all logical planes that include the plane building node and compute nodes of the subcommunicator in a positive direction of a second dimension. In some embodiments of the present invention, the second dimension is orthogonal to the first dimension. Establishing (602), in a positive direction of the first dimension, all logical planes that include the plane building node and compute nodes of the subcommunicator in a positive direction of a second dimension may include assigning the plane building node to be the lower left node of a logical plane of the subcommunicator. After assigning the plane building node as the lower left node, the following steps may be carried out iteratively, beginning with a node one hop away from the lower left node in a positive direction of the first dimension until a node at a next hop away from the lower left node is not included in the subcommunicator. First, the plane building node may assign a node at a next hop away from the lower left node in the positive direction of the first dimension to be the lower right node of the logical plane of the subcommunicator. Next, the plane building node, may iteratively, beginning with nodes one hop away from the lower left node and lower right node in a positive direction of a second dimension until a node at a next hop away from the lower left or lower right node is not included in the subcommunicator: assign a node at a next hop away from the lower left node in the positive direction of the second dimension to be the upper left node of the logical plane and assigning a node at a next hop away from the lower right node in the positive direction of the second dimension to be the upper right node of the logical plane. The steps described here include nested iterative loops. The outer iterative loop adds a node in the same, first dimension as the plane building node as part of the plane. Then, within the outer iterative loop, the plane building node iteratively adds nodes in the second dimension to form planes.

Figure 8A:
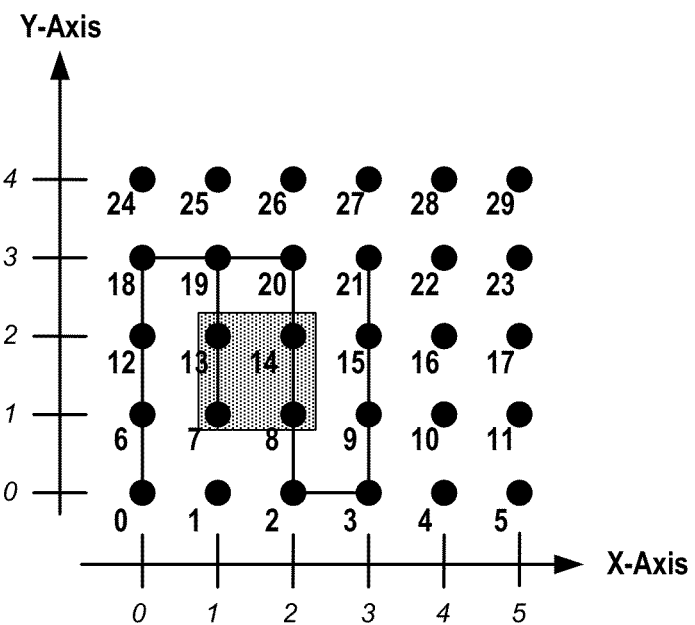
FIG. 8A sets forth a line drawing illustrating another example communicator and subcommunicator from which a plurality of logical planes formed of compute nodes of the subcommunicator may be identified according to embodiments of the present invention.

For purposes of explanation FIGS. 8A, 8B, 9A, and 9B, set forth iterations of the nested iterative loops described above. In FIG. 8A, the compute node 7 (the plane building node for this example), assigns itself to be the lower left node of a logical plane of the subcommunicator. Then, the plane building node assigns a node at a next hop away (node 8) from the lower left node in the positive direction of the first dimension (the X-dimension) to be the lower right node of the logical plane of the subcommunicator. Note, as mentioned above, that this is step is carried out only if the node at a next hop away is also included in the subcommunicator. That is, if node 8 were not included in the subcommunicator, no planes in the positive direction of the X-dimension could be formed that include node 7. Next, node 7 assigns a node at a next hop away (node 13) from the lower left node in the positive direction of the second dimension (the Y-dimension) to be the upper left node of the logical plane. Again, this step is carried out only if the node is also in the same subcommunicator. Then, node 7 assigns a node at a next hop away from the lower right node (node 14) in the positive direction of the second dimension to be the upper right node of the logical plane. Again, this step is carried out only if the node is also in the same subcommunicator. At this point, node 7 has identified a plane that includes node 7, node 8, node 13, and node 14.

Figure 8B:
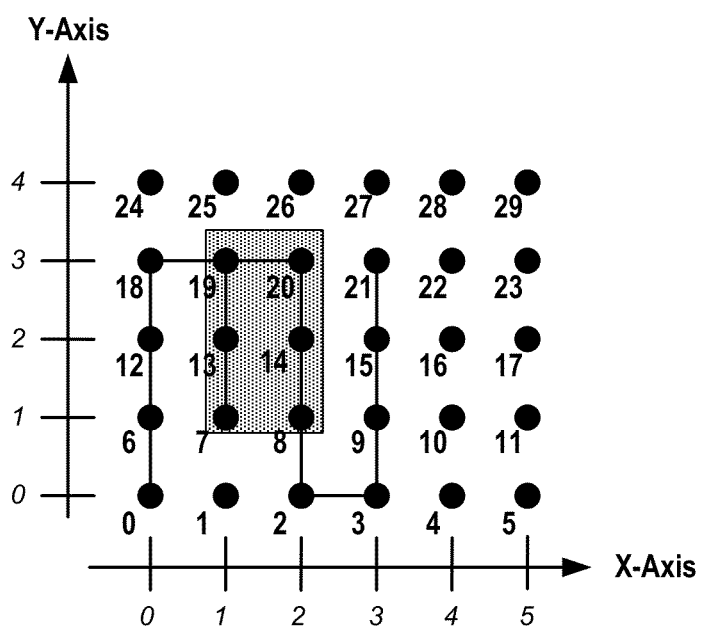
FIG. 8B sets forth a line drawing illustrating another example communicator and subcommunicator from which a plurality of logical planes formed of compute nodes of the subcommunicator may be identified according to embodiments of the present invention.

While maintaining node 7 as the lower left node and node 8 as the lower right node, node 7 then proceeds, in FIG. 8B, with a second iteration of establishing a plane in the positive direction of the second dimension by adding nodes of the same subcommunicator an additional hop away from the previous upper left and upper right nodes to the subcommunicator. In the example of FIG. 8B, nodes 19 and 20 are included in the subcommunicator and as such are set as the upper left and upper right nodes of a second logical plane of which node 7 is a part. At this point, node 7 has established two logical planes: the one described in FIG. 8A and the plane formed of nodes 7, 8, 19, and 20 in FIG. 8B.

Figure 9A:
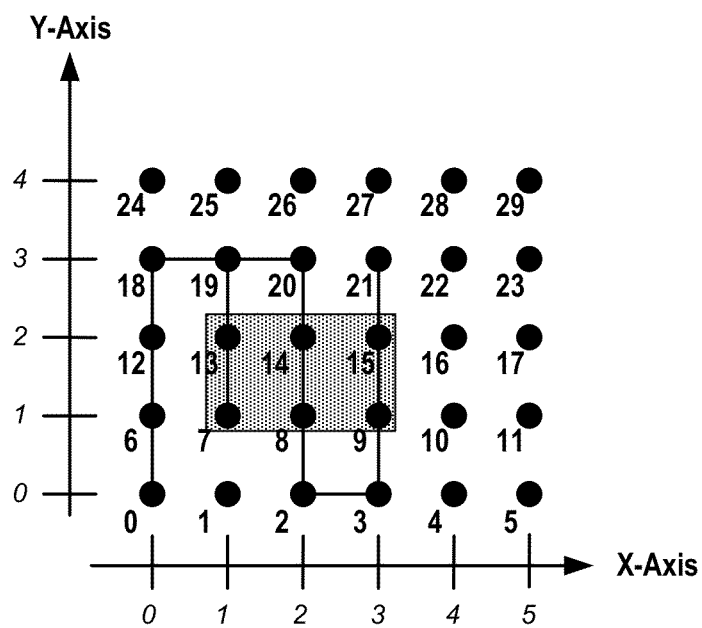
FIG. 9A sets forth a line drawing illustrating another example communicator and subcommunicator from which a plurality of logical planes formed of compute nodes of the subcommunicator may be identified according to embodiments of the present invention.

Because neither node 25 nor 26 (nodes an additional hop away from the previously assigned upper left and right nodes) are not part of the subcommunicator, node 7 ceases iteratively adding nodes in the positive direction of the Y dimension to logical planes. Instead, a second iteration of the outer iterative loop begins as depicted in FIG. 9A. In FIG. 9A, node 7 assigns a node that is included in the subcommunicator and is also an additional hop away from the previous lower right node in the positive direction of the X-dimension to be the lower right node. In the example of FIG. 9A, node 9 is assigned as the lower right node. Then, in a manner similar to the example of FIG. 8A, node 7 assigns node 13 (the node a next hop away from node 7 in the Y-dimension) to be the upper left node and assigns node 15 (the node a next hop away from the lower right node in the Y-dimension) to be the upper right node.

Figure 9B:
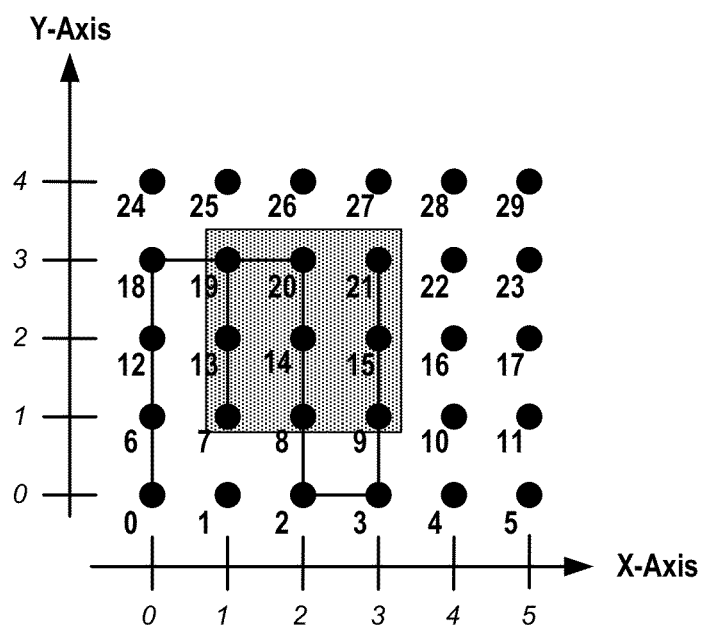
FIG. 9B sets forth a line drawing illustrating another example communicator and subcommunicator from which a plurality of logical planes formed of compute nodes of the subcommunicator may be identified according to embodiments of the present invention.

FIG. 9B, depicts the second iteration in the Y dimension. In this example, node 7 assigns node 19 (the node a next hop away from the previous upper left node) to be the upper left node and node 21 (the node a next hop away from the previous upper right node) to be the upper right node.

As can be seen from FIGS. 8A-9B, the plane building node effectively establishes logical planes beginning one hop away in the positive X dimension, then iteratively one hop away in the positive Y dimension. Then the plane building node begins again another hop away in the positive X dimensions, followed by iterations one hop away in the positive Y dimension. Any iteration that encounters a node one hop away that is not included in the subcommunicator, causes the establishment of planes to cease. In some embodiments, the plane building node also establishes planes in the negative direction of the second dimension in a manner similar to that described above. That is, after establishing planes in the positive direction of the first dimension and the positive direction of the second dimension, the plane building node may establish in the positive direction of the first dimension, all logical planes that include the plane building node and compute nodes of the subcommunicator in a negative direction of the second dimension. Further, after establishing planes in the negative direction of the first dimension and positive direction of the second dimension, the plane building node may also establish in the negative direction of the first dimension, all logical planes that include the plane building node and compute nodes of the subcommunicator in the negative direction of the second dimension. In this way, each node may identify in each direction of each plane, all logical planes of which the node is a part.

Returning now to FIG. 6: the method of FIG. 6 also includes establishing (604), by the plane building node, in a negative direction of the first dimension, all logical planes that include the plane building node and compute nodes of the subcommunicator in the positive direction of the second dimension. Establishing (604) in a negative direction of the first dimension, all logical planes that include the plane building node and compute nodes of the subcommunicator in the positive direction of the second dimension may be carried out in various ways, including in a manner similar to that described above for the positive direction of the first dimension. The plane building node may assign itself to be the lower right node of a logical plane of the subcommunicator and iteratively, beginning with a node one hop away from the lower right node in the negative direction of the first dimension until a node at a next hop away from the lower right node is not included in the subcommunicator: assign a node at a next hop away from the lower right node in the negative direction of the first dimension to be the lower left node of the logical plane of the subcommunicator. Further, as part of that iteration, the plane building node may carry out a second iterative loop beginning with a node one hop away from the lower right node and a node one hop away from the lower left node in the positive direction of the second dimension until a node at a next hop away from the lower right or lower left node is not included in the subcommunicator. Such iterations may include assigning a node at a next hop away from the lower right node in the positive direction of the second dimension to be the upper right node of the logical plane and assigning a node at a next hop away from the lower left node in the positive direction of the second dimension to be the upper left node of the logical plane.

Figure 10A:
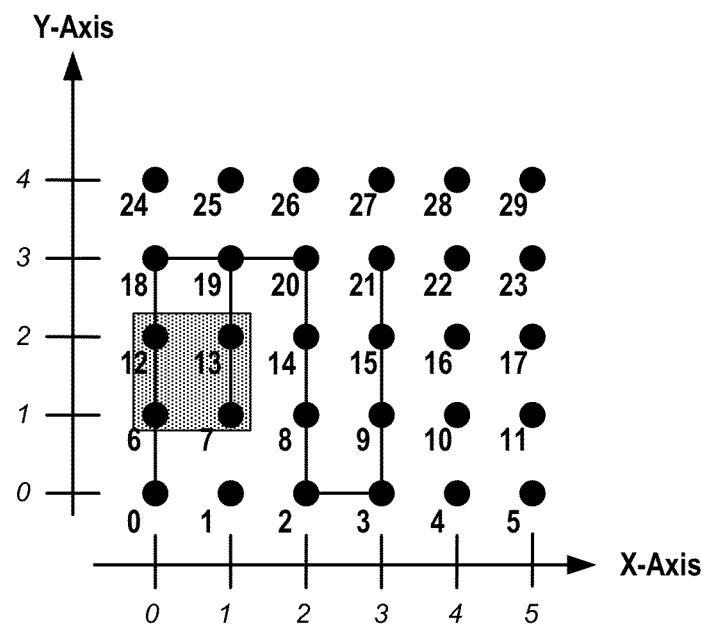
FIG. 10A sets forth a line drawing illustrating another example communicator and subcommunicator from which a plurality of logical planes formed of compute nodes of the subcommunicator may be identified according to embodiments of the present invention.
Figure 10B:
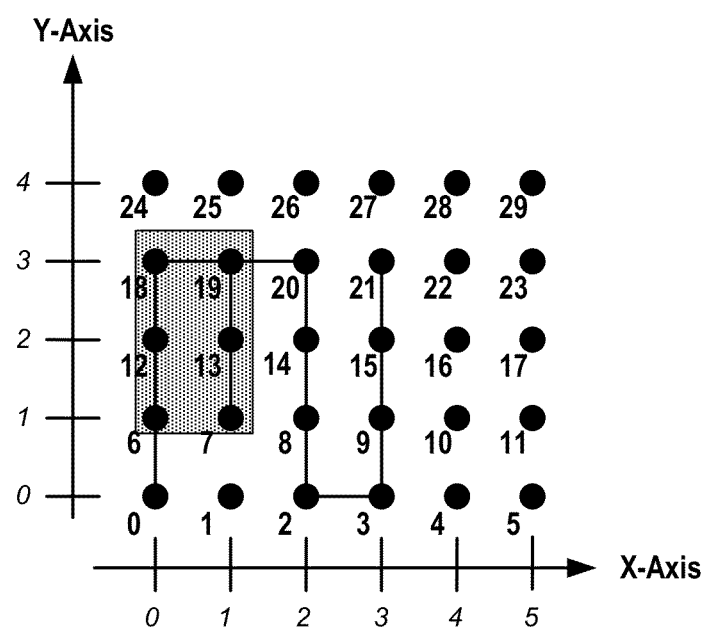
FIG. 10B sets forth a line drawing illustrating another example communicator and subcommunicator from which a plurality of logical planes formed of compute nodes of the subcommunicator may be identified according to embodiments of the present invention.

For further explanation, consider the example provided in FIGS. 10A and 10B. In FIG. 10A, the plane building node (node 7) assigns itself to be the lower right node. Then, the plane building node sets a node one hop away in the negative direction of the X-dimension to be the lower left node only if that node is included in the subcommunicator. If that node is not included in the subcommunicator no planes can be built in the negative direction of the X-dimension that include node 7. In this example, however, node 6 is included in the subcommunicator and is assigned to be the lower left node. Then, node 7 assigns node 12 (a node one hop away from the lower left node) to be the upper left node and assigns node 13 (a node one hop away from the lower right node) to be the upper right node of a plane. Thus, a first plane is established. It is noted, again, that if either of node 12 or node 13 were not included in the subcommunicator, a plane could not be established and node 7 would cease attempting to establish logical planes in the negative direction of the X-dimension.

In FIG. 10B, node 7 proceeds with a second iteration in the positive direction of the Y-dimension while maintaining the lower left node at node 6. In this example, node 7 assigns node 18 (a node one hop away from the previous upper left node) to be the upper left node and assigns node 19 (a node one hop away from the previous upper right node) to be the upper right node. Thus, a second plane is established. At this point, there is no node in the subcommunicator included one hop away from the node 18 and node 19 and, as such, node 7 ceases attempting to establish logical planes in the positive direction of the Y-dimension.

Readers of skill in the art will recognize that two dimensions are utilized in FIGS. 7-10B as means for explanation only, not limitation. The steps set forth above may be applied for each of any number of dimensions. Further, these steps may be extended for higher-dimensional shapes than planes. Consider, for example, that while a plane is defined by four nodes, a cube may be defined by eight.

The following pseudocode is yet another example of the steps 602 and 604 of the method of FIG. 6:

```
//ll=lower left, lr=lower right, ul=upper right, ur=upper right
// given N dimensions
0 <= m < N
//coordinate of each node is expressed as node.coords[array of size (N)]
// each plane building node separately and in parallel may execute
the following:
for m = 0 to N-1 {
    BuildPositivePlane(PBN, m);
    BuildNegativePlane(PBN, m);
}
BuildPositivePlane (node_ll, m)
{
    let node_lr = node_ll; //initialize each node's coordinates to be
    the plane building
    let node_ul = node_ll; // node's coordinates
    let node_ur = node_ll;
    for (d = 1; d < length_of(m); d++)
    {
        node_lr.coords[m] = node_ll.coords[m] + d;
        node_ur.coords[m] = node_ll.coords[m] + d;
        if (node_lr is in subcommunicator)
        {
            for (i = 0; i < length_of(next_dimension); i++)
            {
                node_ul.coords[next_dimension] += i;
                node_ur.coords[next_dimension] += i;
                if (node_ul && node_ur are in the linear
                communicator)
                    create a plane spanning nodes (ll, lr, ul, ur);
            }
        }
        else break;
    }
}
BuildNegativePlane (node_lr, m)
{
    let node_ll = node_lr; // initialize each node's coordinates
    to be the plane building
    let node_ul = node_lr; // node's coordinates
    let node_ur = node_lr;
    for (d = 1; d < length_of(m); d++)
    {
        node_ll.coords[m] = node_lr.coords[m] - d
```

```
            node_ur.coords[m] = node_lr.coords[m] - d
         if (node_ll is in linear communicator)
            {
               for (i = 0; i < length_of(next_dimension); i++)
                  {
                     node_ul.coords[next_dimension] += i;
                     node_ur.coords[next_dimension] += i;
                     if (node_ul && node_ur are in the linear
                        communicator)
                           create a plane spanning nodes (ll, lr, ul, ur)
                  }
            }
         else break;
      }
}
```

Returning now to the method of FIG. 6, the method also includes constructing (606) a set of unique logical planes of the subcommunicator in dependence upon the logical planes established by each node and performing (608) data communications amongst the compute nodes of the subcommunicator utilizing optimization techniques based on the topology of the unique logical planes As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus for performing data communications amongst compute nodes of a communicator in a parallel computer, the apparatus comprising a computer processor, a computer memory operatively coupled to the computer processor, the computer memory having disposed within it computer program instructions that, when executed, cause the apparatus to carry out the steps of:
    identifying a set of unique logical planes formed of compute nodes of a subcommunicator, wherein the subcommunicator is a subset of nodes of the communicator, wherein identifying the set of unique logical planes comprises, for each compute node of the subcommunicator and iteratively, for a plurality of dimensions beginning with a first dimension:
        establishing, by a plane building node, in a positive direction of the first dimension, all logical planes that include the plane building node and compute nodes of the subcommunicator in a positive direction of a second dimension, wherein the second dimension is orthogonal to the first dimension; and
        establishing, by the plane building node, in a negative direction of the first dimension, all logical planes that include the plane building node and compute nodes of the subcommunicator in the positive direction of the second dimension;
    constructing the set of unique logical planes of the subcommunicator in dependence upon the logical planes established by each node, wherein each of the unique logical planes comprises adjacent nodes of the subcommunicator; and
    upon constructing the set of unique logical planes of the subcommunicator, performing data communications amongst the compute nodes of the subcommunicator utilizing optimization techniques based on the topology of the unique logical planes.

2. The apparatus of claim 1, wherein establishing, in a positive direction of the first dimension, all logical planes that include the plane building node and compute nodes of the subcommunicator in a positive direction of a second dimension, further comprises:
    assigning the plane building node to be the lower left node of a logical plane of the subcommunicator;
    iteratively, beginning with a node one hop away from the lower left node in a positive direction of the first dimension until a node at a next hop away from the lower left node is not included in the subcommunicator:
    assigning a node at a next hop away from the lower left node in the positive direction of the first dimension to be the lower right node of the logical plane of the subcommunicator; and
    iteratively, beginning with nodes one hop away from the lower left node and lower right node in a positive direction of a second dimension until a node at a next hop away from the lower left or lower right node is not included in the subcommunicator: assigning a node at a next hop away from the lower left node in the positive direction of the second dimension to be the upper left node of the logical plane and assigning a node at a next hop away from the lower right node in the positive direction of the second dimension to be the upper right node of the logical plane.

3. The apparatus of claim 1, wherein establishing, by the plane building node, in a negative direction of the first dimension, all logical planes that include the plane building node and compute nodes of the subcommunicator in the positive direction of the second dimension, further comprises:
    assigning the plane building node to be the lower right node of a logical plane of the subcommunicator;
    iteratively, beginning with a node one hop away from the lower right node in the negative direction of the first dimension until a node at a next hop away from the lower right node is not included in the subcommunicator:
    assigning a node at a next hop away from the lower right node in the negative direction of the first dimension to be the lower left node of the logical plane of the subcommunicator; and
    iteratively, beginning with a node one hop away from the lower right node and a node one hop away from the lower left node in the positive direction of the second dimension until a node at a next hop away from the lower right or lower left node is not included in the subcommunicator: assigning a node at a next hop away from the lower right node in the positive direction of the second dimension to be the upper right node of the logical plane and assigning a node at a next hop away from the lower left node in the positive direction of the second dimension to be the upper left node of the logical plane.

4. The apparatus of claim 1, wherein a topology of the subcommunicator communicator comprises a torus network topology comprising N-dimensions and N comprises an integer greater than one.

5. The apparatus of claim 1, wherein the communicator has a regular topology and the subcommunicator has an irregular topology.

6. A computer program product for performing data communications amongst compute nodes of a communicator in a parallel computer, the computer program product disposed upon a non-transitory computer readable medium, the computer program product comprising computer program instructions that, when executed, cause a computer to carry out the steps of:
    identifying a set of unique logical planes formed of compute nodes of a subcommunicator, wherein the subcommunicator is a subset of nodes of the communicator, wherein identifying the set of unique logical planes comprises, for each compute node of the subcommunicator and iteratively, for a plurality of dimensions beginning with a first dimension:
        establishing, by a plane building node, in a positive direction of the first dimension, all logical planes that include the plane building node and compute nodes of the subcommunicator in a positive direction of a second dimension, wherein the second dimension is orthogonal to the first dimension; and
        establishing, by the plane building node, in a negative direction of the first dimension, all logical planes that include the plane building node and compute nodes of the subcommunicator in the positive direction of the second dimension;

constructing a set of unique logical planes of the subcommunicator in dependence upon the logical planes established by each node, wherein each of the unique logical planes comprises adjacent nodes of the subcommunicator; and upon constructing the set of unique logical planes of the subcommunicator, performing data communications amongst the compute nodes of the subcommunicator utilizing optimization techniques based on the topology of the unique logical planes.

7. The computer program product of claim 6, wherein constructing the set of unique logical planes of the subcommunicator in dependence upon the logical planes established by each node comprises filtering duplicate planes identified by the compute nodes of the subcommunicator.

8. The computer program product of claim 6, wherein establishing, in a positive direction of the first dimension, all logical planes that include the plane building node and compute nodes of the subcommunicator in a positive direction of a second dimension, further comprises:

assigning the plane building node to be the lower left node of a logical plane of the subcommunicator;

iteratively, beginning with a node one hop away from the lower left node in a positive direction of the first dimension until a node at a next hop away from the lower left node is not included in the subcommunicator:

assigning a node at a next hop away from the lower left node in the positive direction of the first dimension to be the lower right node of the logical plane of the subcommunicator; and iteratively, beginning with nodes one hop away from the lower left node and lower right node in a positive direction of a second dimension until a node at a next hop away from the lower left or lower right node is not included in the subcommunicator: assigning a node at a next hop away from the lower left node in the positive direction of the second dimension to be the upper left node of the logical plane and assigning a node at a next hop away from the lower right node in the positive direction of the second dimension to be the upper right node of the logical plane.

9. The computer program product of claim 6, wherein establishing, by the plane building node, in a negative direction of the first dimension, all logical planes that include the plane building node and compute nodes of the subcommunicator in the positive direction of the second dimension, further comprises:

assigning the plane building node to be the lower right node of a logical plane of the subcommunicator;

iteratively, beginning with a node one hop away from the lower right node in the negative direction of the first dimension until a node at a next hop away from the lower right node is not included in the subcommunicator:

assigning a node at a next hop away from the lower right node in the negative direction of the first dimension to be the lower left node of the logical plane of the subcommunicator; and iteratively, beginning with a node one hop away from the lower right node and a node one hop away from the lower left node in the positive direction of the second dimension until a node at a next hop away from the lower right or lower left node is not included in the subcommunicator: assigning a node at a next hop away from the lower right node in the positive direction of the second dimension to be the upper right node of the logical plane and assigning a node at a next hop away from the lower left node in the positive direction of the second dimension to be the upper left node of the logical plane.

10. The computer program product of claim 7, wherein a topology of the subcommunicator communicator comprises a torus network topology comprising N-dimensions and N comprises an integer greater than one.

11. The apparatus of claim 1, wherein constructing the set of unique logical planes of the subcommunicator in dependence upon the logical planes established by each node comprises filtering duplicate planes identified by the compute nodes of the subcommunicator.

12. The computer program product of claim 6, wherein the communicator has a regular topology and the subcommunicator has an irregular topology.

* * * * *